United States Patent [19]
Dodgen

[11] Patent Number: 5,701,826
[45] Date of Patent: Dec. 30, 1997

[54] TABLE FOR RECREATIONAL VEHICLES

[76] Inventor: John N. Dodgen, #8 Woodland Est., Humboldt, Iowa 50548

[21] Appl. No.: 748,236

[22] Filed: Nov. 12, 1996

Related U.S. Application Data

[63] Continuation of Ser. No. 359,911, Dec. 20, 1994, abandoned.

[51] Int. Cl.$^6$ .............................. A47B 9/00; A47B 23/00
[52] U.S. Cl. .............................. 108/44; 108/139; 108/144; 297/173
[58] Field of Search .............................. 108/63, 144, 145, 108/139, 44; 297/135, 170, 173, 174, 188.21

[56] References Cited

U.S. PATENT DOCUMENTS

| | | | |
|---|---|---|---|
| 734,218 | 7/1903 | Bley . | |
| 1,247,112 | 11/1917 | Helmberg et al. | 108/139 |
| 4,672,898 | 6/1987 | Davidson | 108/144 X |
| 5,099,768 | 3/1992 | Kirchner | 108/139 X |

FOREIGN PATENT DOCUMENTS

| | | | |
|---|---|---|---|
| 991153 | 6/1976 | Canada | 109/139 |
| 279629 | 11/1927 | United Kingdom | 108/63 |
| 381506 | 10/1932 | United Kingdom | 108/63 |

*Primary Examiner*—Peter M. Cuomo
*Assistant Examiner*—Hank V. Tran
*Attorney, Agent, or Firm*—Zarley, McKee, Thomte, Voorhees & Sease

[57] ABSTRACT

A table for recreational vehicles has an inverted L-shaped support member comprised of a vertical arm and a horizontal arm. The vertical arm has a lower end and the horizontal arm has an outer end. A pivotal support element is mounted on the lower end of the vertical arm to permit the support member to pivot about a vertical axis. A horizontal table top is pivotally secured at its lower center portion about a vertical axis to the outer end of the horizontal arm. The table has a primary central table surface having side edges, and secondary table surfaces hingedly secured to the side edges so that the secondary table surfaces can be moved to an outwardly extended horizontal position during operation, and can be folded on top of the central table surface for storage purposes.

1 Claim, 4 Drawing Sheets

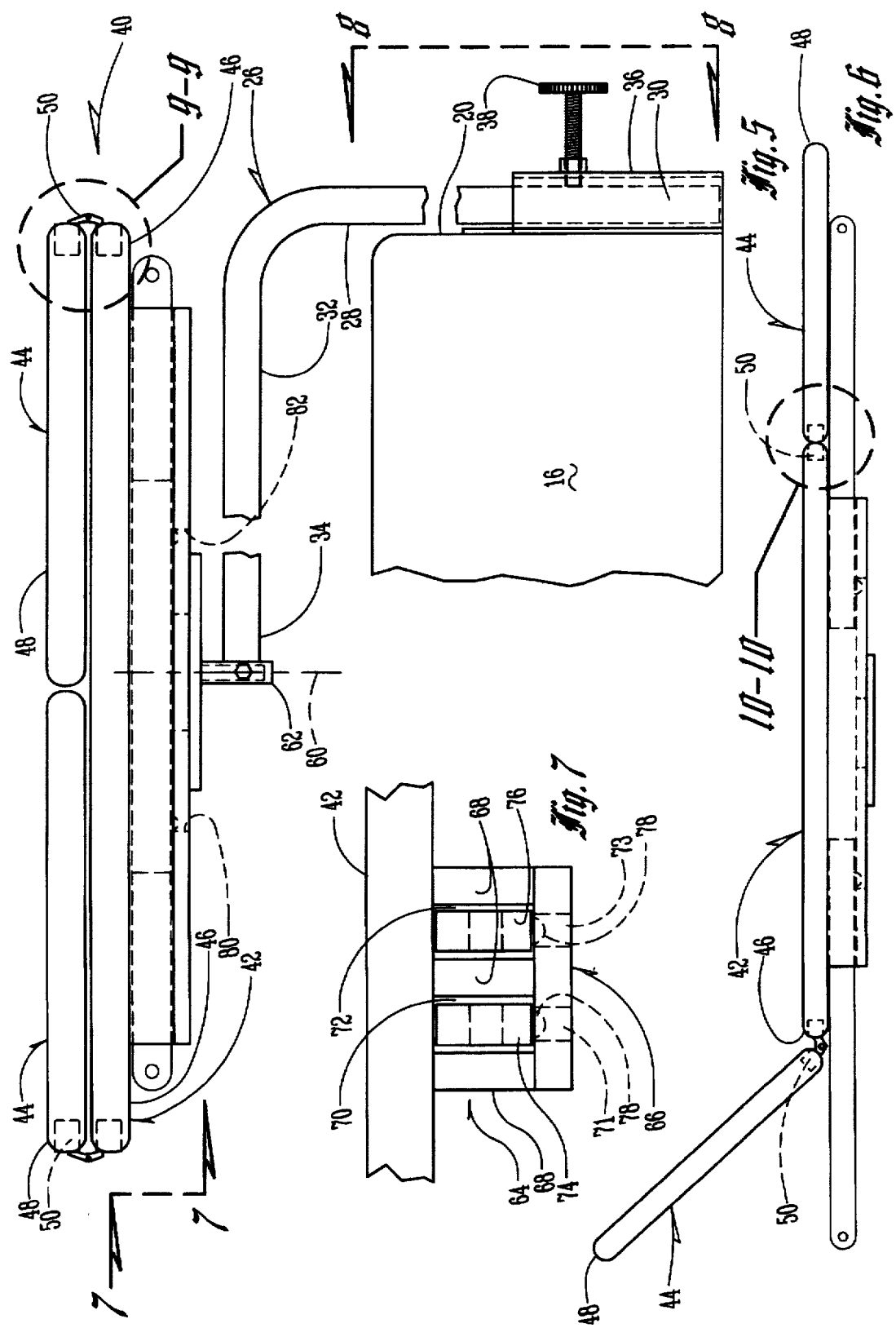

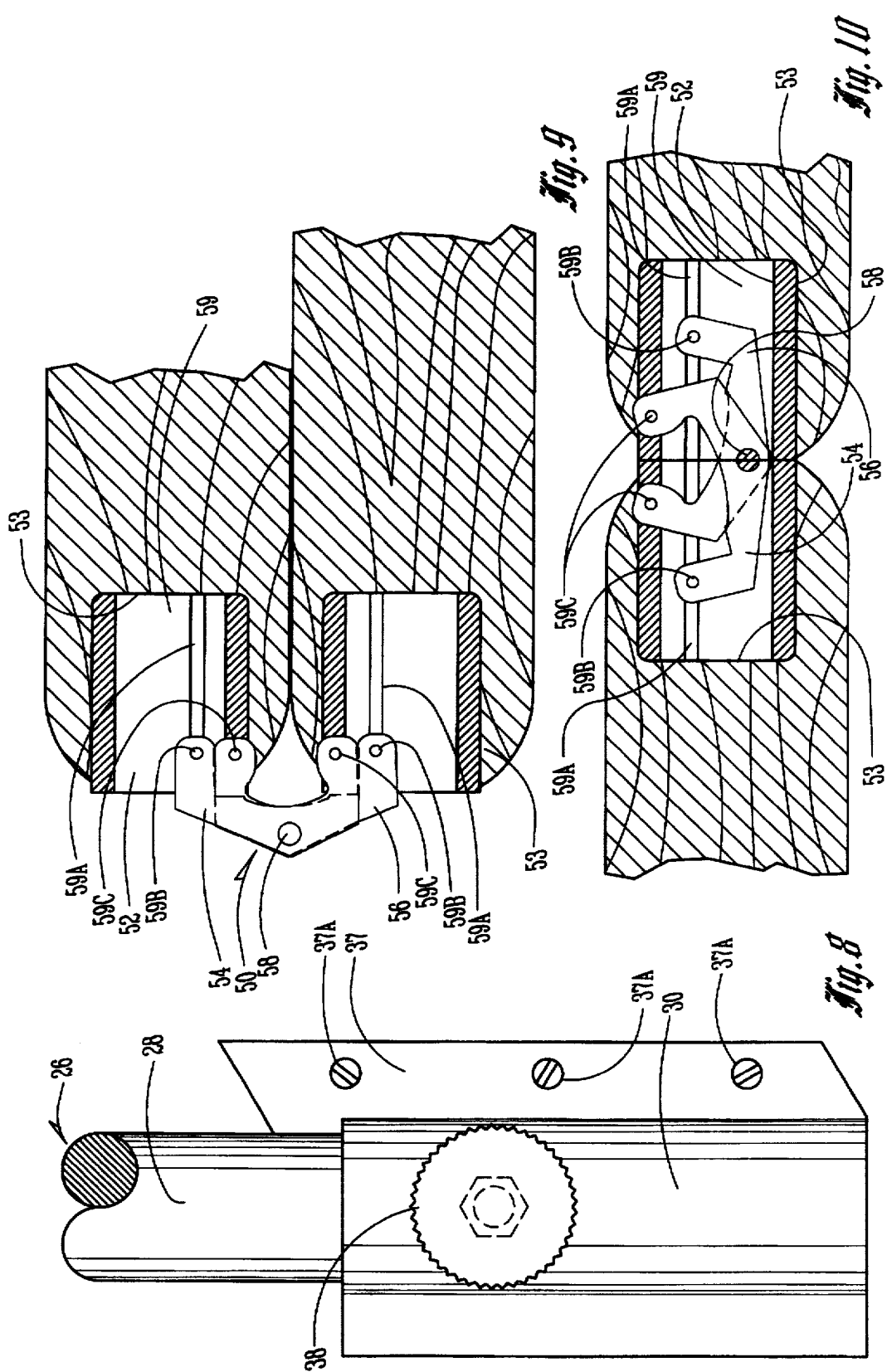

TABLE FOR RECREATIONAL VEHICLES

This is a continuation of application Ser. No. 08/359,911 filed on Dec. 20, 1994 now abandoned.

BACKGROUND OF THE INVENTION

Recreational vehicles often contain a sofa or twin bed on opposite lateral sides of the vehicle, with swivel-mounted captain's chairs located in the cab of the vehicle spaced from one of the sofas or twin beds. Heretofore, it has been difficult if not impossible to provide a table surface that will accommodate all four pieces of furniture either severally or collectively.

In addition, it is difficult heretofore to provide a table for recreational vehicles that can be selectively enlarged, reduced in size, or stored.

It is therefore a principal object of this invention to provide a table for recreational vehicles which can be moved to a plurality of positions from a single supporting means to accommodate a plurality of seats located in the vehicle.

A further object of this invention is to provide a table for recreational vehicles which can be easily moved from position to position about a single means of support, and selectively moved to an inoperative position or a storage position.

These and other objects will be apparent to those skilled in the art.

SUMMARY OF THE INVENTION

This invention entails a table for recreational vehicles which has an inverted L-shaped support member comprised of a vertical arm and a horizontal arm. The vertical arm has a lower end and the horizontal arm has an outer end. A pivotal support element is mounted on the lower end of the vertical arm to permit the support member to pivot about a vertical axis. A horizontal table top is pivotally secured at its lower center portion about a vertical axis to the outer end of the horizontal arm. The table has a primary central table surface having side edges, and secondary table surfaces hingedly secured to the side edges so that the secondary table surfaces can be moved to an outwardly extended horizontal position during operation, and can be folded on top of the central table surface for storage purposes.

DESCRIPTION OF THE DRAWINGS

FIG. 5 is an enlarged scale elevational view showing the table in the folding condition of FIGS. 1 or 2;

FIG. 6 is a side elevational view of the table in its expanded and unfolded condition;

FIG. 7 is a large scale sectional view taken on line 7—7 of FIG. 5;

FIG. 8 is an enlarged scale partial elevational view taken on line 8—8 of FIG. 5;

FIG. 9 is an enlarged scale sectional view taken on line 9—9 of FIG. 5; and

FIG. 10 is an enlarged scale sectional view taken on line 10—10 of FIG. 6.

DESCRIPTION OF THE PREFERRED EMBODIMENT

Figure 1:
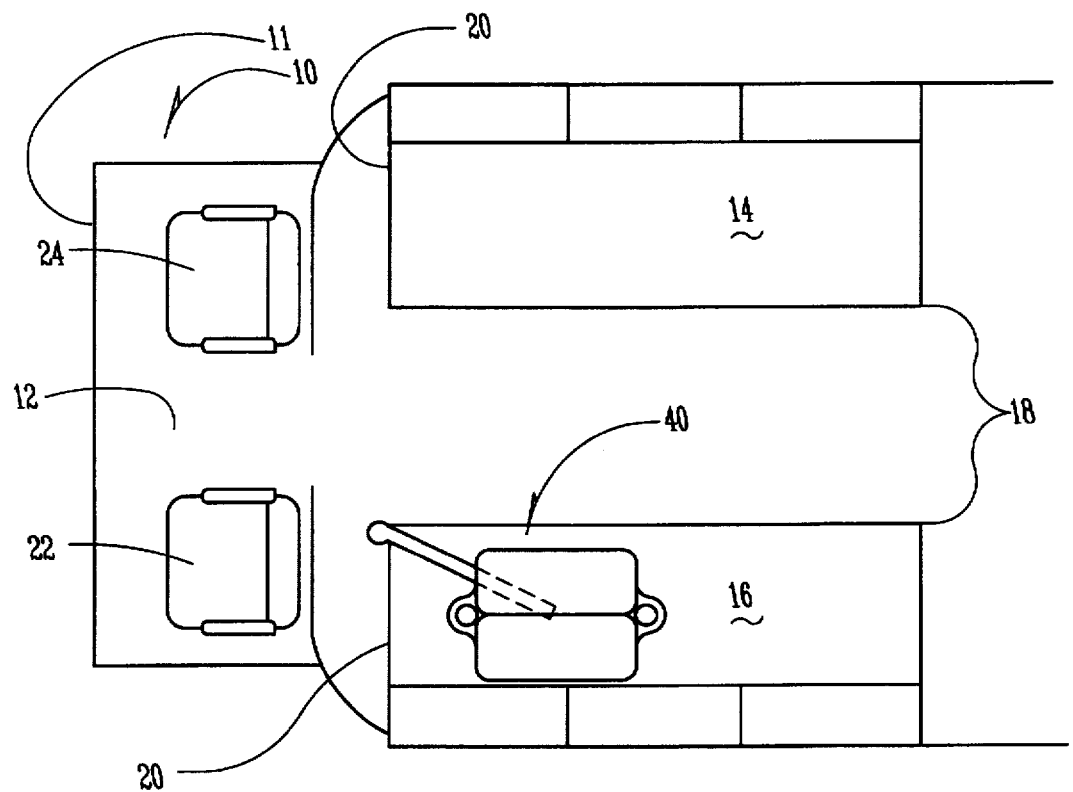
FIG. 1 is a partial plan view of a recreational vehicle showing the table of this invention positioned in a storage position to permit walking through the aisle of the vehicle.

A recreational vehicle 10 having a conventional cab 11 has a supporting floor 12. Seating couches, sofas or beds 14 and 16 are positioned along the lateral sides of the floor 12 and have an elongated aisle or space 18 therebetween. Ends 20 of couches 14 and 16 are spaced from but are adjacent the swivel chairs or captain's chairs 22 and 24 in the cab 11.

An inverted L-shaped support member 26 (FIG. 5) has a vertical arm 28 with a lower end 30. Support member 26 also has a horizontal arm 32 and an outer end 34 which extend laterally away at right angles from the top of vertical arm 28. A pivotal support element 36 of cylindrical construction is secured to bracket assembly 37 (FIG. 8) which in turn can be secured in any convenient way to the end of couch 16, such as by screws 37A. A releasable set screw 38 extends through support element 36 and is adapted to bind or lock the lower end of vertical arm within the support element to selectively prevent the pivotal movement of the support member 26 within the pivotal support element 36.

With reference to FIG. 5, a table top 40 has a central horizontal surface 42 and secondary or lateral surfaces 44 secured to the side edges 46 of surface 42 and the adjacent side edges 48 of secondary surfaces 44. The secondary table surfaces 44 are secured to the central horizontal surface 42 by conventional barrel hinges 50 which are best shown in FIGS. 9 and 10. The barrel hinges 50 do not of themselves comprise the essence of this invention, and are well known in the furniture art. The barrel hinges 50 are comprised of barrels 52 which are frictionally received within sockets 53 of side edges 46 and 48. Links 54 and 56 are pivotally secured together by pin 58 and are mounted within bore 59 of the respective barrels. A longitudinal groove 59A appears within bore 59 of each barrel, and pins 59B attached to each of the links 54 and 56 are slidably mounted within groove 59A. Pins 59C are stationary and secure the ends of links 54 and 56 opposite to pins 59B to the body of the barrels.

As shown in FIG. 5, the table top 40 has a central point 60 at its lower surface and a pivotal mounting bracket 62 secured to the lower surface of table top 40 and having a vertical pivotal axis is attached to the outer end of the horizontal arm 32 of support member 26.

With reference to FIGS. 5, 6 and 7, an extension bracket 64 is secured to the lower surface of table top 40 and has a bottom 66 with three spaced vertical walls 68 (FIG. 7). Elongated slot 70 appears between one of the outer side walls 68 and the central side wall 68, and a second slot 72 appears between the central wall 68 and the opposite wall 68. Elongated slots 71 and 73 are located in bottom 66 in alignment with the slots 70 and 72, respectively. Extension bars 74 and 76 are slidably mounted within the slots 70 and 72. Stop elements 78 are located on the bottom of each of the extension bars 74 and 76 and extend into the slots 71 and 73. When the stop 78 on slide 74 engages the end 80 of slot 71, the extension bar 74 cannot be extended any further. Similarly, when the stop element 78 on slide 76 engages the end 82 of slot 73, the slide 76 cannot be extended any further (see FIG. 6).

In operation, it can be seen from FIG. 1 that the table top 40, when in the folded position of FIG. 5, can be moved to a storage or inoperative position over sofa 16 so as to leave aisle 18 completely open for access.

Figure 2:
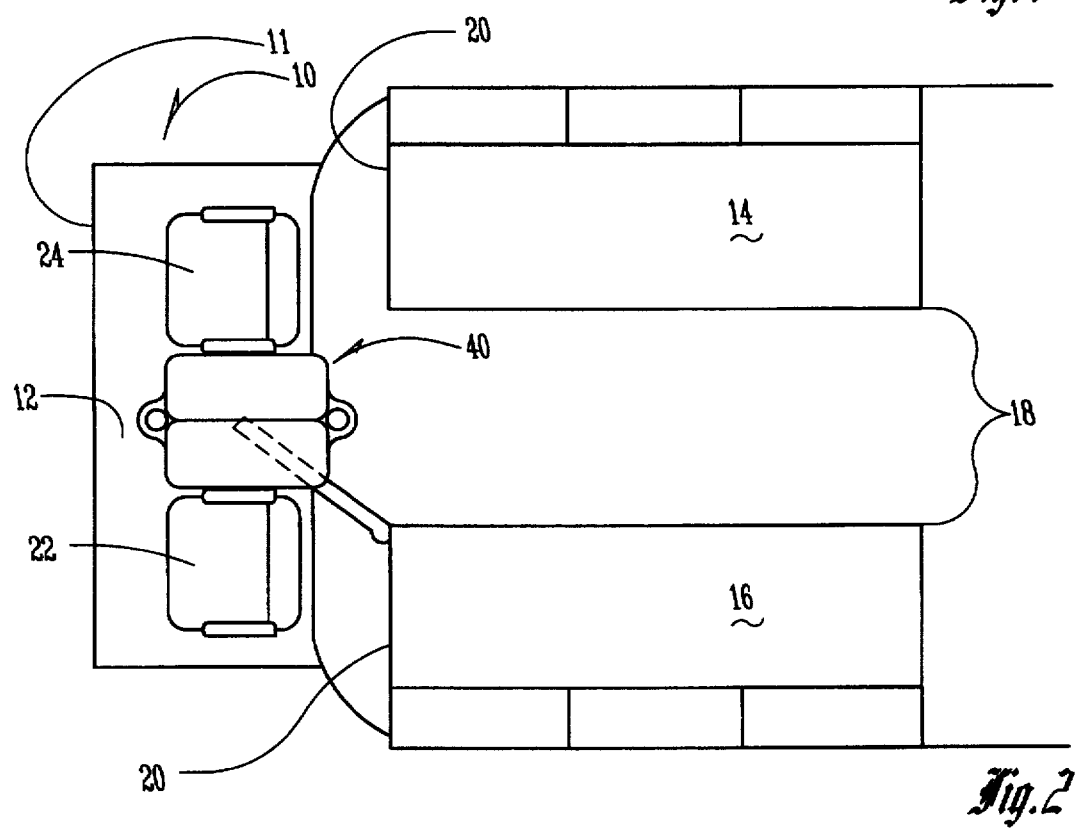
FIG. 2 is a plan view similar to that of FIG. 1 but shows the table pivoted to a position while the sofa or twin beds are in use, and/or to serve the table needs of the captain's chairs.

FIG. 2 shows how the table top 40 can be pivoted again in its folded condition to a storage or even a service area between the two captain's chairs 22 and 24. Normally, FIG. 2 shows the position of table top 40 when the sofas 14 and 16 are in use either as sitting furniture or as sleeping furniture.

Figure 3:
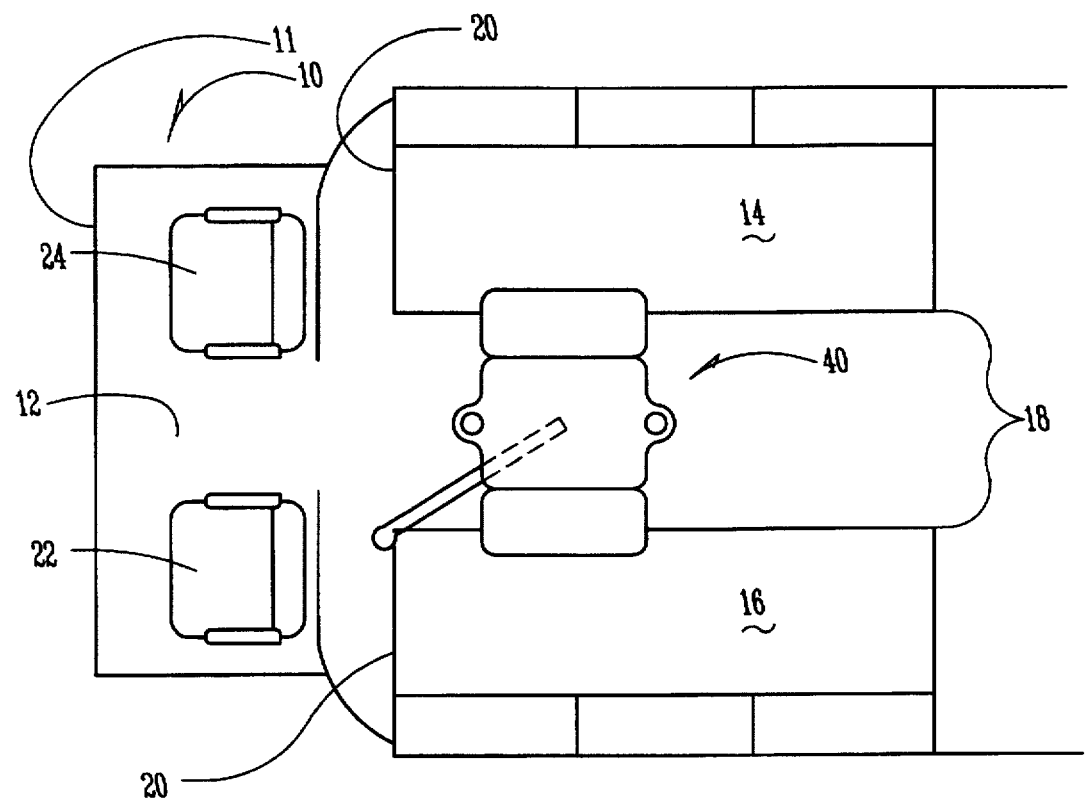
FIG. 3 is a plan view similar to that of FIG. 1 but shows the table moved to serve the table needs of persons seated in the oppositely disposed sofas.

FIG. 3 shows the position of table top 40 in its unfolded condition (see FIG. 6) when it is in use by persons sitting on the sofas 14 and 16.

Figure 4:
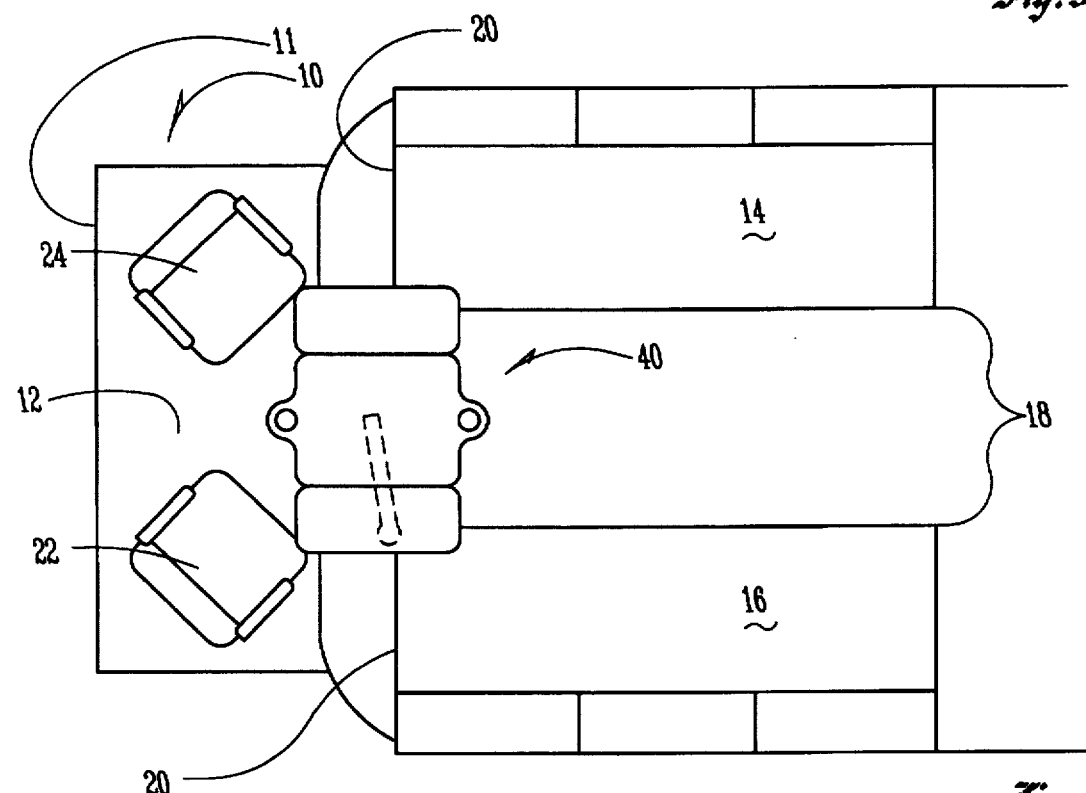
FIG. 4 is a plan view similar to FIG. 1 but shows the table mounted in a position to serve the table needs of persons sitting in both the captain's chairs and at the oppositely disposed sofas.

Lastly, FIG. 4 shows the position of the unfolded table top pivoted to a position where it can service persons sitting both in the chairs 22 and 24 as well as persons sitting near the ends of sofas 14 and 16.

The use of the barrel hinges 50 allows them to be substantially hidden when the table is in its unfolded condition (FIG. 10).

The table is locked in whatever position it is moved to by tightening the set screw 38 in the manner described.

While the barrel hinges normally would hold the secondary surfaces 44 in a horizontal position in the unfolded condition (FIG. 6), the extension bars 74 and 76 can be moved to the extended position of FIG. 6 to provide support for the unfolded secondary surfaces 44. When the table is in its folded condition as shown in FIG. 5, the extension bars are slidably moved inwardly into slots 70 and 72 so as not to protrude beyond the folded perimeter of the table.

From the foregoing, it is seen that the device of this invention will achieve at least its stated objectives.

What is claimed is:

1. A table in combination with a recreational vehicle having opposite furniture seats with an aisle space therebetween, and each of said seats having an end portion in spaced relation to two pivotally mounted seats, said table comprising, an inverted L-shaped support member having a vertical arm and a horizontal arm, said vertical arm having a lower end and said horizontal arm having an outer end, said vertical arm being positioned adjacent the end portion of one of said furniture seats, a pivotal support element on the lower end of said vertical arm to permit said support member to pivot about a vertical axis, a horizontal table top pivotally secured about a vertical axis to the outer end of said horizontal arm, whereby said table top can be pivoted to a plurality of pivotal positions with respect to said horizontal arm, and said support member can be pivoted to a plurality of pivotal positions with respect to said pivotal support element to move said table top to a plurality of operational positions with respect to said pivotal support element, means for releasably fixing the lower end of said vertical arm to said pivotal support element, said furniture seats and said pivotally mounted seats being sufficiently spaced with respect to each other and with respect to said vertical arms, and said table top and said horizontal arms being of sufficient magnitude to permit said table top to be accessible to persons sitting in each of said furniture seats when in a first position, and to permit said table top to be accessible to persons seated in said pivotally mounted seats when in a second position.

\* \* \* \* \*